United States Patent [19]

Isobe et al.

[11] Patent Number: 5,068,270

[45] Date of Patent: Nov. 26, 1991

[54] COMPOSITION FOR WATER PROOF SHEETS

[75] Inventors: Kazuyuki Isobe, Tokyo; Takao Aizawa, Yokohama; Noboru Yamaguchi, Yokohama; Yutaka Ueda, Yokohama, all of Japan

[73] Assignees: Nippon Unicar Company Limited; Bridgestone Corporation, both of Danbury, Conn.

[21] Appl. No.: 457,924

[22] Filed: Dec. 27, 1989

Related U.S. Application Data

[63] Continuation-in-part of Ser. No. 379,519, Jul. 13, 1989, abandoned.

[51] Int. Cl.$^5$ .............................................. C08J 77/00
[52] U.S. Cl. ........................................ 524/68; 524/70; 524/71
[58] Field of Search ............................ 524/68, 70, 71

[56] References Cited

U.S. PATENT DOCUMENTS

| | | | |
|---|---|---|---|
| 3,790,569 | 2/1974 | Wahlberg | 524/70 |
| 3,963,659 | 6/1976 | Binder et al. | 524/70 |
| 4,829,109 | 5/1989 | Ciaccia et al. | 524/68 |

FOREIGN PATENT DOCUMENTS 483415  9/1975  U.S.S.R. ............................. 524/70

*Primary Examiner*—Melvyn I. Marquis
*Attorney, Agent, or Firm*—Clement J. Vicari

[57] ABSTRACT

A composition for producing a water-proof sheet comprising 100 weight parts of a linear ethylene-alpha-olefin copolymer having a density equal to or less than 0.910 g/ml, and 10–200 weight parts of asphalt. Water proof sheets produced from the composition are also included in the invention.

In a preferred mode, the composition also includes an organic peroxide.

6 Claims, No Drawings

COMPOSITION FOR WATER PROOF SHEETS

This application is a continuation in part of application Ser. No. 07/379,519 filed July 13, 1989 and now abandoned.

FIELD OF THE INVENTION

This invention relates to a composition for producing water proof sheets for use in water proofing layers of concrete structures, and to a water-proof sheet formed from the composition.

DESCRIPTION OF THE PRIOR ART

Asphalt is used in many fields because of its good flowability, its adhesion characteristics and its water-proof abilities. Moreover it is inexpensive and there is a large supply of asphalt available. Good resistance of asphalts to exterior damages allows it to be used suitably in water-proof sheets.

Unfortunately water-proof sheets which contain only asphalt have high temperature-sensitivities and the sheets become brittle and fragile at low temperatures resulting in among other things lower elongation properties. When these sheets are used in conjunction with concrete, cracks occurring in the concrete due to elongation and shrinkage of the concrete, results in breakage of the asphalt covering the concrete, and as a result the concrete is no longer effective. In addition, at high temperatures asphalt softens and flows.

In order to overcome these disadvantages, there has been proposed water-proof sheets made of compositions comprising asphalt and various thermoplastic resins, rubber and like materials. For example, Japanese Patent Publication No. 3417/1977 discloses a water-proof sheet made of a composition comprising 100 weight parts of bitumen mainly containing blown asphalt, 10–40 weight parts of a styrene-butadiene rubber, 20–50 weight parts of short fibers and 1–5 weight parts of polybutene. Unfortunately in these compositions expensive components, such as styrene-butadiene rubber, polybutene, and the like, are used which are economically unattractive. In addition, styrene-butadiene rubber, one of the prior art components, has poor heat-aging resistance.

Japanese Laid Open Publication No. 24348/1978 discloses a water-proof sheet made of a thermoplastic resin composition comprising atactic polypropylene and asphalt having an average molecular weight of about 3,000 to about 50,000 and containing 1 weight part, and 0.1–2 weight parts respectively. In the composition the atactic polypropylene has every two carbon atoms of its polymer bonded with a methyl group, i.e., tertiary carbon atoms. The composition however is very prone to degradation by oxygen and heat. Hence disadvantageously, the water-proof sheet has poor durability.

Japanese Patent Laid-Open Publication No. 73085/1976 proposes a resilient sheet material in the form of a sheet made of a composition which comprises an asphalt matrix comprising 100–200 weight parts of asphalt and 10–100 weight parts of thermoplastic resin (e.g., polyethylene, polyamide, polypropylene, polyvinylacetate, polyvinylchloride, polyvinylidenechloride, ethylene, vinyl acetate copolymer, petroleum resin, butene resin, polystyrene resin and the like; 50–400 weight parts of powdered vulcanized rubber; and 800 or less weight parts of a powdered mineral matter having an average particle diameter equal to or less than 100 microns, the latter two being distributed in the asphalt matrix. Unfortunately however the thermoplastic resin has poor compatibility with asphalt and it cannot be dispersed homogeneously in the asphalt. Even if proper dispersion were attainable, the resultant sheet material lacks stiffness, and it is difficult to handle and work the sheet.

An object of this invention is to provide a water-proof sheet and a composition for forming the water-proof sheet which has good heat-aging resistance, durability, weatherability and chemical resistance.

Another object is to provide a sheet which is not easily breakable due to external pressures exerted to the sheet, and which has sufficient stiffness to provide easy handling, workability and good adhesion.

STATEMENT OF THE INVENTION

Broadly contemplated, the present invention provides a composition for producing a water-proof sheet comprising 100 weight parts of a linear ethylene-alpha-olefin copolymer having a density equal to or less than 0.910 g/ml, and 10–200 weight parts of asphalt. The present invention also includes a water-proof sheet formed from the composition.

In addition, the present invention also provides a composition for producing a water-proof sheet comprising 100 weight parts of a silicone-grafted linear ethylene-alpha-olefin copolymer prepared by adding an unsaturated alkoxysilane and an organic peroxide to a linear ethylene-alpha-olfein copolymer having a density equal to or less than 0.910 g/ml; and 20–200 weight parts of asphalt and 0.01 to 10 weight parts of a silanol-condensation catalyst. Water-proof sheets made from this composition is also included in the invention.

In a preferred mode, an organic peroxide is included in the composition in amounts of up to and including 5 weight parts of organic peroxide based on the weight of the composition.

DESCRIPTION OF THE PREFERRED EMBODIMENTS

The ethylene-alpha-olefin copolymers which can be used in the present invention are copolymers containing at least 50% ethylene preferably at least 70% ethylene, and an alpha-olefin having 3-12 carbon atoms. The alpha-olefin selected can be linear or branched and can be propylene, butene-1, pentene-1, hexene-1, heptene-1, octene-1, 4-methyl pentene-1, 4-methyl hexene-1, 4,4-dimethyl pentene-1, and like alpha-olefins.

The ethylene-alpha-olefin copolymer can be produced in the vapor phase using the so-called Ziegler catalyst produced by combining a transition metal compound of a metal in the Group IV to the Group VIII category of the periodic table and an organometallic compound of a metal in the Group I to Group III category. The ethylene-alpha-olefin copolymer can be produced at lower temperatures and under lower pressures compared with conventional high-pressure polyethylene.

More specifically, the linear ethylene-alpha-olefin copolymer used in this invention can be produced by the process for continuously producing ethylene copolymers as disclosed in U.S. Pat. No. 4,302,565 wherein a gas mixture containing (a) at least one higher alpha-olefin having 3–8 carbon atoms and ethylene in a mol ratio of 0.35:1–8.0:1, and (b) at least 25 mol % of at least one diluting gas is continuously contacted in a fluidized bed reaction zone, at a temperature of about 10° C.–80° C. and under a pressure equal to or lower than 7,000 KPa with a particle catalyst comprising a precursor composition having the formula $$Mg_mTi(OR)_nX_p[ED]$$

wherein:

R is an aliphatic or aromatic hydrocarbon group having 1–14 carbon atom(s), or COR' in which R' is an aliphatic or aromatic hydrocarbon group having 1–14 carbon atom(s), X is Cl, Br, or I and their mixtures, ED is an organic electron donating compound selected from an aliphatic or aromatic alkyl ester, an aliphatic ether, a cyclic ether and an aliphatic ketone, m is an integer of 0.5 to and including 56, n is 0,1 to 2, p is 2 to 116 and q is 2 to 85, the precursor compound being diluted with an inert carrier material, and is completely activated by an organic aluminum compound. The activated compound is used in such a quantity that total quantities of the aluminum and titanium in the reaction zone are in a mol ratio of 10:0 to 400:1.

More specifically, the linear ethylene-α-olefin copolymer used in this invention is produced by the process described in U.S. Pat. No. 4,508,842 in which process ethylene monomers singly or together with at least one α-olefin having 3–10 carbon atoms are polymerized by contact in the vapor phase and at a temperature of about 10° C.—about 115° C. with a catalyst composition comprising:

(A) a carrier precursor comprising:

(1) a vanadium compound, a reaction product between (a) vanadium trihalide of chlorine, bromine and iodine and (b) an electron donor, an organic Lewis base in which the vanadium trihalide is soluble, and (2) a modifier having the formula:

$$MX_a$$

wherein:

M is either boron or $AlR_{(3-a)}$, and wherein each R is an alkyl having a total number of aliphatic carbon atoms not exceeding 14, X is chlorine, bromine or iodine, a is 0, 1 or 2 with the proviso that when M is boron X is 3;

(B) a cocatalyst having the formula $$AlR_3$$

wherein:

R is as defined above; and (C) an accelerator having the formula $$R'_bCX'_{(4-b)}$$

wherein:

R' is hydrogen, or an unsubstituted lower alkyl halogen, X' is halogen, and b is 0, 1 or 2).

In the present invention the asphalt can include, as a main component, an oily hydrocarbon referred to as medium or marten, asphalt resin, bitumen containing colloidal particle or ultrafine particle carbon, natural asphalt and petroleum asphalt. The natural asphalt is exemplified as asphaltite, such as gilsonite, glulmite, glance pitch, lake asphalt, such as Trinidad asphalt, and rock asphalt.

The petroleum asphalt used can be straight asphalt produced by distilling crude oil, blown asphalt produced by blowing oxygen into straight asphalt in the presence or absence of a catalyst, asphalt deasphalted using a solvent, such as propane, from a fraction containing an asphalt component, cut-back asphalt produced by mixing straight asphalt with volatile petroleum, etc. The asphalt which is preferably used in this invention is the so-called asphalt compound. It is preferable that the asphalt compound have a high hardness and a high softening point. The most preferable asphalt which is used has a penetration of a leaded needle of about 10 to about 30 (measured at 25° C., under a load of 100g and for 5 seconds in accordance with JIS K 2530), a softening point of about 85–120° C. (measured in accordance with JIS K 2531), and a melt viscosity of about 40 to 70 C.P. (measured at 250° C. in accordance with JIS K 6381).

The silicone-grafted linear ethylene-α-olefin copolymer used in the invention is produced by generating free radicals in a linear ethylene-α-olefin copolymer using an organic peroxide at a temperature higher than the melting point of the linear ethylene-α-olefin copolymer and thereafter reacting the copolymer with an unsaturated alkoxysilane expressed by the formula $RR'SiY_2$ with the free radicals in the ethylene-α-olefin.

In the formula $RR'SiY_2$ expressing the alkoxysilane, R is an aliphatically unsaturated hydrocarbon group or a hydrocarbonoxy group which is reactive with the free radicals generated in the ethylene alpha olefin.

The group is exemplified by vinyl, acryl, butenyl, dichlohexenyl, and cyclopentadieniel. Among these the vinyl group is more preferable. Y is alkoxy group, e.g., a methoxy group, an ethoxy group or a butoxy group. R' is monovalent hydrocarbon group having no olefin unsaturation, e.g., Y group or hydrogen. γ-methaacryloyloxypropyl trimethoxyhsilane, vinyl trimethoxysilane, and vinyl trimethoxysilane are the most preferable silanes. The silane is used in an amount of 0.5–10 weight parts to a weight part of the polyolefin.

According to this invention, the asphalt is mixed in an amount of 20–200 weight parts to 100 weight parts of the linear ethylene-α-olefin copolymer or its silicone-grafted copolymer. Amounts of asphalt below 20 weight parts results in poor fabricability and adhesion. Amounts of asphalt above 200 weight parts results in poor resistance to cracks in an under layer on a sheet, poor adhesion, poor heat resistance, poor handling, poor workability, etc. The so-called stiffness of the sheet material lacks, and undesirably blocking is apt to occur.

The silanol condensation catalyst which can be employed in the invention is one which acts as a catalyst for accelerating the dehydrating condensation among silanols of silicone. Typical silanol condensation catalysts which can be employed include dibutyl tin-dilaurate, dibutyl tin-diacetate, dibutyl tin-octoate, tin(I)-acetate, naphthenate cobalt, ethyl amine, dibutyl amine, etc. The silanol condensation catalyst can be added to the silane-grafted ethylene-α-olefin copolymer or to the asphalt when the sheet is formed. The silanol condensation catalyst is employed in an amount of about 0.001–10 parts by weight to one part by weight of the copolymer, preferably about 0.1–5 weight parts.

The organic peroxide which can be employed in the invention is one which has a decomposition temperature of 100° C. to 200° C. for a 10 minute half-life, and includes the following with their decomposition temperature (° C) in parentheses: succinic acid peroxide (110), benzoyl peroxide (110), t-butyl peroxy-2-ethyl hexanoate (113), p-chlorobenzoyl peroxide (115), t-butyl peroxy isobutylate (115), t-butyl isopropyl carbonate (135), t-butyl peroxy laurete (140), 2,5-dimethyl-2,5-di(benzoyl peroxy) hexane (140), t-butyl peroxy acetate (140), di-t-butly diperoxy phthalate (140), t-butyl peroxy maleic acid (140), cyclohexanone peroxide (145), t-butyl peroxy benxoate (145), dicumyl peroxide (150), 2,5-dimethyl-2,5-di(t-butyl peroxy) hexane (155), t-butyl cumyl peroxide (155), t-butyl hydroperoxide (158), di-t-butyl peroxide (160, 2,5-dimethyl-2,5-di(t-butyl peroxy)hexane-3 (170), di-isopropyl benzene hydroperoxide (170), p-methane hydroperoxide (180), and 2,5-dimethyl hexane-2,5-di-hydroperoxide (213). The most preferred peroxide is dicumyl peroxide.

According to the invention, the organic peroxide content is equal to or less than 5 weight parts of the composition.

In the case where the organic peroxide content is substantially more than 5 weight parts, no increase in the tensile strength and stiffness of the crosslinked sheets are found.

In a most preferred mode, the organic peroxide is soaked into the pellet of linear ethylene-alpha-olefin, copolymer and asphalt by adding the organic peroxide to the pellet and agitating them under the melting point of the copolymer and above the melting point of the organic peroxide to avoid decomposition of the organic peroxide.

The composition for water-proofing according to the invention can also include various materials normally added to resin and asphalt compositions. These materials are normally a stabilizer, an antioxidant, a filler, a coloring agent, carbon black, a crosslinking agent, a lubricant, a fabrication modifier, an antistatic agent, and the like. Advantageously, an organic filler added to the composition of this invention reduces costs, and provides flame retardancy and improves the stiffness of the sheet. However, the addition of an inorganic filler to thermoplastic resins other than the linear ethylene-α-olefin copolymer results in its poor distribution and resultantly nonhomogeneous kneading with the resin components.

The linear-α-olefin copolymer employed according to the present invention has a unique property which allows the copolymer to accommodate a large quantity of the inorganic filler. The inorganic filler is significant as one component of the composition for water-proof sheets according to this invention.

The silane-grafted ethylene-α-olefin copolymer, which contains alkoxysilane groups reactive with the hydroxyl groups on the surface of an inorganic filler, better accommodates the inorganic filler. Thus addition of an inorganic filler is more preferable.

The inorganic filler which can be used in the invention includes calcium carbonate, barium sulfate, talc, mica, calcium silicate, aluminum hydroxide, magnesium hydroxide, glass fiber, and the like.

The composition for water-proofing sheets of the present invention is formed into a sheet of the required thickness by kneading its components with a sufficient shearing force at a normal temperature of 80°-200° C. by a Banbury mixer, press kneader, twin-screw extruder, Buss Ko-kneader Henschel mixer, roll kneader, and spreading the kneaded result, and thereafter cooling with a roller.

It is preferable to apply an adhesive or a coating for the purpose of giving one side of a formed sheet adhesiveness to concrete. The adhesive is, for example, vinyl acetate paste, vinyl acetate emulsion, acryl emulsion, asphalt adhesives, or others but is not limited to the above as long as the adhesive is adhesive to concrete.

It has further been found that the tensile strength and stiffness of the sheets can be remarkably improved by subjecting the sheets to irradiation to accomplish crosslinking. The irradiation can be accomplished by the use of high energy electrons, ultra violet radiation, X-rays, gamma rays, beta particles, etc.

Preferably irradiation is employed up to about 30 megarads dosage level.

The irradiation source can be any electron beam generator operating in a range of about 150 kilovolts to about 8 megavolts with a power output capable of supplying the desired dosage.

The irradiation is normally carried out at a dosage up to about 30 MR, typically between about 1 MR and 30 MR, with a preferred dosage range of about 5 MR to about 20 MR.

The irradiation can be carried out conveniently at room temperature, although higher and lower temperature for example, 0° C. to 60° C. may be employed.

The following Examples will illustrate the invention.

EXAMPLE 1

100 weight parts of a linear ethylene-α-olefin copolymer having a density of 0.900 g/ml and a melt index of 0.8 g/10 minutes (DFDA-1137, made by Nippon Unicar), and 15 weight parts of straight asphalt (penetration of a loaded needle: 60/80, made by Showa Shell Sekiyu) were kneaded by a Banbury mixer at 140° C. for 10 minutes, and then the mixture was pelletized. The pellets were formed by a heat press forming machine at 140° C., under a pressure of 100 Kg/m$^2$ for 2 minutes into a sheet having a thickness of 1.0 mm, a length of 150 mm and a width of 180 mm. The sheet was punched into dumb-bell type test specimens as stipulated in JIS K 6760. These specimens were measured for tensile strength and elongation at a tensile speed of 100 mm/minute. The sheet was punched by a C. die into specimens. These specimens were measured in accordance with ASTM D 638 for stiffness and flexibility of the sheet.

EXAMPLES 2-5

The procedure of Example 1 was followed except that 50, 100 and 200 weight parts respectively of straight asphalt were added in Examples 2, 3 and 4. The same tests were made in Examples 2-5 under the same conditions as in Example 1.

EXAMPLE 6

The same tests were made in Example 6 as in Example 1 except that one of the ethylene-α-olefin copolymers having a density equal to or less than 0.910 g/ml of Example 1 was silicone grafted and used in Example 6. The silicone-grafted copolymer, and a silanol condensation catalyst master batch were prepared as follows. The two were mixed in a ratio of 100:10 before the specimens were formed. The specimens were treated with boiling water for 2 hours for the water crosslinking.

Preparation of Silicone-Grafted Copolymer 100 weight parts of particle linear ethylene-α-olefin copolymer having a density of 0.900 g/ml and a melt index of 0.8 g/10 minutes (DFDA-1137 made by Nippon Unicar), and 0.15 weight parts of dicumyl peroxide, and 2.0 weight parts of vinyl trimethoxysilane were mixed in a mixer until the particles were covered completely with the silane. The mixture was then extruded in a 65 mm extruder having the cylinder portion divided in regions according to set temperatures to produce the silane-grafted copolymer as follows:

| | |
|---|---|
| Cylinder feed portion | 120° C. |
| Cylinder compression portion | 150° C. |
| Cylinder measuring portion | 180° C. |
| Screw rotational speed 30 rotations/min. | |
| Screw discharge amount 30 Kg/hour | |

Preparation of Silanol Condensation Catalyst

One weight part of dibutyl tin-dilaurate was added to 100 weight parts of a high-pressure polyethylene having a density of 0.920 g/ml and a melt index of 1.3 g/10 minutes (DND-2450 made by Nippon Unicar) and was extruded in the above-mentioned 65-mm$\phi$ extruder to prepare the master batch.

EXAMPLE 7

The same tests as in Example 1 were conducted in Example 7 except that 50 weight parts of magnesium peroxide (CUMA made by Kyowa Kagaku) were added to the components of Example 1.

EXAMPLE 8

The same tests as in Example 6 were made in Example 8 except that 50 weight parts of magnesium peroxide (CUMA 5A made by Kyowa Kagaku) were added to the components of Example 6.

EXAMPLE 9

The same tests as in Example 1 were made in Example 9 except that ethylene-α-olefin copolymer having a density of 0.88 (P-0480 TAFMAR made by Mitsui Sekka) was used in place of the copolymer of Example 1 and 35 weight parts asphalt was added instead of 15 weight parts.

EXAMPLE 10

The same tests were performed as in Example 1 except that ethylene-α-olefin copolymer having a density of 0.905 (D-9052 SOFTREX made by Nisseki Kagaku) was used instead of the copolymer of Example 1 and asphalt was added in an amount of 35 weight parts rather than 15 weight parts.

EXAMPLE 11

One Hundred weight parts of a linear ethylene-alpha-olefin copolymer having a density of 0.900g/ml and a melt index of 0.8g/10 minutes (DFDA-1137, made by Nippon Unicar), and 30 weight parts of straight asphalt (penetration of a loaded needle: 60/80, made by Showa Shell Sekiyu) were kneaded by a Banbury mixer at 140° C. for 10 minutes, and then the mixture was pelletized.

One hundred weight parts of the pellets were agitated sufficiently in the tumbler keeping temperature at 50° C. for 1 hour then 3 weight parts of dicumyl peroxide were added to the pellets and agitation continued for 30 minutes, followed by soaking for 2 hours.

The pellets were formed by a heat press forming machine at 170° C. under a pressure of 100kg/m² for 10 minutes into a sheet having a thickness of 1.0 mm, a length of 150mm and a width of 180mm.

The sheet was punched into dumb-bell type test specimens as stipulated in JIS K 6760.

These specimens were tested according to the same procedure of Example 1. Tensile strength was 125kg/cm², elongation was 450% and Stiffness was 550kg/cm².

EXAMPLE 12

A water proof sheet was prepared according to the procedures of Example 1. The sheet was thereafter irradiated at a dosage of 18 megarads at room temperature by the use of high energy electron irradiation.

The irradiated sheet was punched into dumb-bell type test specimens as stipulated in JIS K 6760.

These specimens were tested according to the same procedure of Example 1. Tensile strength was 108kg/cm², elongation was 515% and stiffness was 560kg/cm².

COMPARATIVE EXAMPLES 1, 2, 3 and 6

In comparative Examples 1, 2, 3 and 6 the same tests were performed as in Example 1 except that high-pressure polyethylene, ethylene-α-olefin copolymer having a density of 0.910 g/ml (NUCG-5361, Ml:4.0, density: 0.934), stylene-butadiene rubber, and atactic polypropylene were used in the respective comparative examples.

COMPARATIVE EXAMPLE 4

The same tests were performed as in Comparative Example 3 except that asphalt was added in an amount of 50 weight parts.

COMPARATIVE EXAMPLE 5

The same tests were performed as in Comparative Example 3 except that 50 weight parts of magnesium peroxide (CUMA 5A made by Kyowa Kagaku) were added to the components of Comparative Example 3.

COMPARATIVE EXAMPLE 7

The same tests were performed as in Comparative Example 6 except that straight asphalt was added in an amount of 50 weight parts instead of 15 weight parts of Comparative Example 6.

COMPARATIVE EXAMPLE 8

The same tests were performed as in Comparative Example 6 except that 50 weight parts of magnesium peroxide (CUMA 5A made by Kyowa Kagaku) were added to the components of Comparative Example 6.

The results are all indicated in Table I.

TABLE 1

| | | Examples | | | | | | | | | | Comparative Examples | | | | | | | |
|---|---|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 | 7 | 8 |
| Resin | *1 | 100 | 100 | 100 | 100 | 100 | | 100 | | | | | | | | | | | |
| Component | *2 | | | | | | 100 | | 100 | | | | | | | | | | |
| | *3 | | | | | | | | | 100 | | | | | | | | | |
| | *4 | | | | | | | | | | 100 | | | | | | | | |
| | *5 | | | | | | | | | | | | | 100 | | | | | |

TABLE 1-continued

| | | Examples | | | | | | | | | | Comparative Examples | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 | 7 | 8 |
| | *6 | | | | | | | | | | | 100 | | | | | | | |
| | *7 | | | | | | | | | | | | 100 | 100 | 100 | | | | |
| | *8 | | | | | | | | | | | | | | | 100 | 100 | 100 | |
| Asphalt | *9 | 15 | 50 | 100 | 200 | | 35 | 35 | 35 | 35 | 35 | 35 | 35 | 35 | 50 | 15 | 15 | 50 | 15 |
| Component | *10 | | | | | 30 | | | | | | | | | | | | | |
| Inorganic | *11 | | | | | | | 50 | 50 | | | | | | | 50 | | | 50 |
| Component | *12 | 70 | 95 | 85 | 60 | 60 | 85 | 65 | 80 | 75 | 80 | 40 | 50 | 40 | 35 | 35 | 20 | 15 | 10 |
| | *13 | 580 | 900 | 1090 | 1150 | 500 | 560 | 410 | 380 | 670 | 570 | 210 | 250 | 230 | 260 | 150 | 250 | 200 | 210 |
| | *14 | 500 | 455 | 410 | 350 | 360 | 450 | 600 | 700 | 450 | 480 | 400 | 550 | 200 | 165 | 250 | 180 | 150 | 210 |

*1 Ethylene-α-olefin copolymer having a density equal to or less than 0.910 g/ml
*2 Silicone-grafted ethylene-α-olefin copolymer having a density equal to or less than 0.910 g/ml
*3 Ethylene-α-olefin copolymer having a density of 0.88 (FAFMER made by Mitsui Sekka)
*4 Ethylene-α-olefin copolymer having a density of 0.905 (SOFTREX made by Nisseki Kagaku)
*5 High-pressure polyethylene
*6 Ethylene-α-olefin copolymer having a density of 0.934 (NUCG-5361)
*7 Stylene-butadiene rubber
*8 Atactic polypropylene
*9 Straight asphalt
*10 Blown asphalt
*11 Magnesium peroxide
*12 Tensile strength (Kg/cm$^2$)
*13 Elongation (%)
*14 Stiffness of the sheets (Kg/cm$^2$)

Effect of the Invention

As evident from the Examples, the water-proof sheets comprising a specific resin (ethylene-α-olefin copolymer having a density equal to or less than 0.910 g/ml) or the silicone-grafted resin, and asphalt is effective when compared to the conventional water-proof sheet regarding tensile strength, elongation and stiffness. The water-proof sheets of the present invention further comprising an inorganic filler is far more effective when compared to the conventional water-proof sheets containing the inorganic filler.

What is claimed is:

1. A composition for producing a water-proof sheet comprising 100 weight parts of a silicone-grafted linear ethylene-alpha-olefin copolymer prepared by adding an unsaturated alkoxysilane of the formula:

$$RR'SiY_2$$

wherein:
R is an aliphatically unsaturated hydrocarbon group or a hydrocarbonoxy group which is reactive with said free radicals generated in said copolymer;
Y is an alkoxy group and
R' is a monovalent hydrocarbon group having no olefin unsaturation;
and an organic peroxide to a linear ethylene-alpha-olefin copolymer containing at least 50% ethylene and said alpha olefin having 3-12 carbon atoms, said copolymer having a density equal to or less than 0.910 g/ml; 20-200 weight parts of asphalt and 0.01 to 10 weight parts of a silanol-condensation catalyst.

2. A composition according to claim 1 wherein said ethylene-alpha-olefin copolymer contains at least 70% by weight ethylene.

3. A composition according to claim 1 wherein said silicone grafted linear ethylene-alpha-olefin copolymer is produced by generating free radicals in said linear ethylene alpha olefin copolymer utilizing an organic peroxide at temperatures in excess of the melting point of said linear ethylene alpha olefin copolymer and thereafter reacting said copolymer with unsaturated alkoxysilane of the formula:

$$RR'SiY_2$$

wherein:
R is an aliphatically unsaturated hydrocarbon group or a hydrocarbonoxy group which is reactive with said free radicals generated in said copolymer;
Y is an alkoxy group and
R' is a monovalent hydrocarbon group having no olefin unsaturation.

4. A composition according to claim 1 wherein said condensation catalyst is employed in an amount of about 0.001 to 10 parts by weight to one part by weight of said copolymer.

5. A composition according to claim 1 wherein said organic peroxide is adhered to the surface of pellets comprising said linear ethylene-alpha-olefin copolymer and asphalt and a part of said organic peroxide is soaked into said pellets by adding said organic peroxide to said pellets and agitating said soaked pellets under the melting point of said linear ethylene-alpha-olefin copolymer and above the melting point of said organic peroxide avoiding decomposition of said organic peroxide.

6. A composition according to claim 5 wherein said organic peroxide is dicumyl peroxide.

* * * * *